US010119004B2

(12) United States Patent
Petrovic et al.

(10) Patent No.: US 10,119,004 B2
(45) Date of Patent: *Nov. 6, 2018

(54) FOAM, COMPOSITION, AND METHOD

(71) Applicant: CertainTeed Corporation, Malvern, PA (US)

(72) Inventors: Zoran S. Petrovic, Pittsburg, KS (US); Ivan J. Javni, Pittsburg, KS (US); Mihail Ionescu, Pittsburg, KS (US); Ivana Cvetkovic, Tulsa, OK (US); Alisa Zlatanic, Pittsburg, KS (US); Nikola Bilic, Pittsburg, KS (US); Kwangjin Song, Pittsford, NY (US); DooPyo Hong, Pittsburg, KS (US); John J. Bozek, Harleysville, PA (US); Murray S. Toas, Norristown, PA (US)

(73) Assignee: CERTAINTEED CORPORATION, Malvern, PA (US)

( * ) Notice: Subject to any disclaimer, the term of this patent is extended or adjusted under 35 U.S.C. 154(b) by 164 days.

This patent is subject to a terminal disclaimer.

(21) Appl. No.: 15/466,571

(22) Filed: Mar. 22, 2017

(65) Prior Publication Data

US 2017/0190863 A1    Jul. 6, 2017

Related U.S. Application Data

(60) Continuation of application No. 14/721,595, filed on May 26, 2015, now Pat. No. 9,617,412, which is a division of application No. 13/729,103, filed on Dec. 28, 2012, now Pat. No. 9,487,654.

(60) Provisional application No. 61/581,595, filed on Dec. 29, 2011.

(51) Int. Cl.
| | |
|---|---|
| *C08J 9/00* | (2006.01) |
| *C08J 9/02* | (2006.01) |
| *C08J 9/04* | (2006.01) |
| *C08J 9/14* | (2006.01) |
| *B29C 44/12* | (2006.01) |
| *B29C 44/18* | (2006.01) |
| *B29K 63/00* | (2006.01) |
| *B29K 105/04* | (2006.01) |
| *B29K 105/20* | (2006.01) |
| *B29L 31/10* | (2006.01) |

(52) U.S. Cl.
CPC .......... *C08J 9/146* (2013.01); *B29C 44/1271* (2013.01); *B29C 44/18* (2013.01); *C08J 9/0023* (2013.01); *C08J 9/0038* (2013.01); *B29K 2063/00* (2013.01); *B29K 2105/04* (2013.01); *B29K 2105/20* (2013.01); *B29L 2031/10* (2013.01); *C08J 2203/144* (2013.01); *C08J 2207/04* (2013.01); *C08J 2363/00* (2013.01)

(58) Field of Classification Search
CPC ...... C08J 9/00; C08J 2363/00; C08J 2363/02; C08J 2363/08
See application file for complete search history.

(56) References Cited

U.S. PATENT DOCUMENTS

| | | | |
|---|---|---|---|
| 3,298,973 A | 1/1967 | Quarles et al. | |
| 3,310,507 A * | 3/1967 | Shepherd | C08J 9/02 521/104 |
| 3,311,574 A * | 3/1967 | Bowering | C08G 8/28 521/104 |
| 3,322,700 A | 5/1967 | Dowd | |
| 3,355,306 A | 11/1967 | Krol | |
| 3,373,121 A | 3/1968 | Burgert et al. | |
| 3,433,809 A | 3/1969 | Trudel | |
| 3,872,199 A | 3/1975 | Ottinger | |
| 3,941,725 A | 3/1976 | Schmitter et al. | |
| 4,092,296 A | 5/1978 | Skiff | |
| 4,225,460 A | 9/1980 | Newell | |
| 5,116,883 A | 5/1992 | LeMay | |
| 5,525,681 A | 6/1996 | Barron et al. | |
| 6,444,713 B1 | 9/2002 | Pachi et al. | |
| 6,479,560 B2 * | 11/2002 | Freitag | C08J 9/0061 521/130 |
| 6,479,590 B1 | 11/2002 | Freitag et al. | |
| 6,727,293 B2 | 4/2004 | Rader | |
| 6,890,964 B2 | 5/2005 | Czaplicki et al. | |
| 8,003,730 B1 | 8/2011 | Celina | |
| 8,779,016 B2 | 7/2014 | O'Leary et al. | |
| 9,487,654 B2 | 11/2016 | Petrovic et al. | |
| 2006/0047010 A1 | 3/2006 | O'Leary | |
| 2008/0161430 A1 | 7/2008 | Korwin-Edson et al. | |
| 2008/0161432 A1 | 7/2008 | Korwin-Edson et al. | |
| 2008/0281006 A1 | 11/2008 | O'Leary et al. | |
| 2010/0127204 A1 | 5/2010 | Birnbrich et al. | |
| 2010/0281811 A1 | 11/2010 | Knapp | |

(Continued)

FOREIGN PATENT DOCUMENTS

| | | |
|---|---|---|
| CA | 761048 A | 6/1967 |
| CA | 761049 A | 6/1967 |

(Continued)

OTHER PUBLICATIONS

Technical Search, 1 page, 2011.
Chen et al. "heat-resistant Epoxy-boroxine foams for high temperature applications", Polymer Engineering & Science, Apr. 1965, vol. 5, No. 2, pp. 90-100.

(Continued)

*Primary Examiner* — Kara B Boyle
(74) *Attorney, Agent, or Firm* — Abel Law Group, LLP; Alexander H Plache

(57) ABSTRACT

A method of producing a foam is disclosed. The method includes providing an epoxy-containing compound, a cationic catalyst, an optional blowing agent, and at least one additive. The method further includes combining the epoxy-containing compound with the cationic catalyst, the optional blowing agent, and the at least one additive, wherein the epoxy-containing compound and the cationic catalyst react to polymerize the epoxy-containing compound to provide the foam having a density from about 0.3 lbs/ft$^3$ to about 5.0 lbs/ft$^3$ as measured by ASTM D1622. Further disclosed are the foam and a method for installing the foam.

20 Claims, No Drawings

(56) References Cited

U.S. PATENT DOCUMENTS

| | | |
|---|---|---|
| 2011/0224317 A1 | 9/2011 | O'Leary |
| 2012/0059076 A1 | 3/2012 | Olang |
| 2012/0183694 A1 | 7/2012 | Olang |
| 2015/0252185 A1 | 9/2015 | Petrovic et al. |

FOREIGN PATENT DOCUMENTS

| | | |
|---|---|---|
| DE | 1720775 A | 7/1971 |
| JP | S42007713 B | 3/1967 |
| JP | S45-016588 Y1 | 7/1970 |
| JP | S47042936 B | 10/1972 |
| JP | S5076175 A | 6/1975 |
| WO | 2012030941 A1 | 3/2012 |

OTHER PUBLICATIONS

Hajimichael et al. "Investigation and Development of Epoxy Foams", British Polymer Journal, 1986, vol. 18, No. 5, pp. 307-311.

Bonnaillie et al. "Thermosetting foam with a high bio-based content from acrylated epoxidized soybean oil and carbon dioxide", Journal of Applied Polymer Science, Apr. 9, 2007, vol. 105, No. 3, pp. 1042-1052.

Altuna et al. "Syntactis foams from copolymers based on epoxidized soybean oil", Composites: Part A, Sep. 2010, vol. 41, No. 9, pp. 1238-1244.

International Search Report & Written Opinion dated Apr. 25, 2013 with regard to corresponding PCT application No. PCT/US2012/071898.

\* cited by examiner

FOAM, COMPOSITION, AND METHOD

CROSS-REFERENCE TO RELATED APPLICATION(S)

This application claims priority under 35 U.S.C. § 120 to and is a continuation of U.S. application Ser. No. 14/721,595 entitled "Foam, Composition, and Method," by Petrovic et al., filed May 26, 2015, which in turn claims priority under 35 U.S.C. § 120 to and is a divisional of U.S. application Ser. No. 13/729,103, now U.S. Pat. No. 9,487,654, entitled "Foam, Composition, and Method," by Petrovic et al., filed Dec. 28, 2012, which in turn claims priority under 35 U.S.C. § 119(e) to U.S. Patent Application No. 61/581,595 entitled "Foam, Composition, and Method," by Petrovic et al., filed Dec. 29, 2011, of which all applications are assigned to the current assignee hereof and incorporated herein by reference in their entireties.

BACKGROUND

Field of the Disclosure

This invention relates generally to providing a foam for application to and installation in buildings or other end uses requiring a cellular insulating, cushioning, or packaging material and, in particular, to a method for the spraying or production of the foam.

Description of the Related Art

Polyurethane foam is a popular form of thermal insulation in the construction industry and as cushioning in the furniture and bedding industry. Polyurethane foam is generally produced by mixing a polyol and an isocyanate along with amine or organometallic catalysts and a combination of water and a hydrofluorocarbon blowing agent. Rigid foams use methylene diphenyl diisocyanate (MDI) as the isocyanate component. Exposure to high concentration of the isocyanate will elicit direct irritant response which may be accompanied by such symptoms as a cough, chest pain, increased fluid in the lungs, and possibly difficulty in breathing. While polyurethane spray foams have been used for about 30 years with a significant market share of foams, there is an un-met need in developing a safer and environmentally friendly spray foam system.

Safe foam is defined as a non-isocyanate polyurethane or non-polyurethane spray foam which can be installed without fresh air supply to the installer with the only requirement of safety goggles, an air filtering respirator and chemically resistant gloves. Target foaming/curing rates and the foam densities should be similar to the commercially available spray foam polyurethane products.

Accordingly, an improved spray foam composition would be desirable.

SUMMARY OF THE INVENTION

In an embodiment, a method of producing a foam includes providing an epoxy-containing compound, a cationic catalyst, an optional blowing agent, and at least one additive; and combining the epoxy-containing compound with the cationic catalyst, the optional blowing agent, and the at least one additive, wherein the epoxy-containing compound and the cationic catalyst react to polymerize the epoxy-containing compound to provide the foam having a density from about 0.3 lbs/ft$^3$ to about 5.0 lbs/ft$^3$ as measured by ASTM D1622.

In another embodiment, a foam includes a composition comprising an epoxy-containing compound, a cationic catalyst, an optional blowing agent, and at least one additive, the foam having a density from about 0.3 lbs/ft$^3$ to about 5.0 lbs/ft$^3$ as measured by ASTM D1622.

In an embodiment, a method of installing a foam includes mixing an epoxy-containing composition with a cationic catalyst, an optional blowing agent, and at least one additive to form a foam composition; and applying the foam composition to a material to form the foam, wherein the foam has a density from about 0.3 lbs/ft$^3$ to about 5.0 lbs/ft$^3$ as measured by ASTM D1622.

The foregoing and other objects and advantages of these embodiments will be apparent to those of ordinary skill in the art in view of the following detailed description taken in conjunction with the appended claims.

DETAILED DESCRIPTION

Embodiments of a method of producing a foam, the foam, and a method of installing the aforementioned foam are disclosed. In an embodiment, a composition for producing foam includes an epoxy-containing compound, a cationic catalyst, an optional blowing agent, and at least one additive. In an embodiment, the at least one additive includes a surfactant, a flame retardant, and combinations thereof. The resulting foam composition provides a foam that has a desirable density as well as cure time. In a particular embodiment, the foam has a density that is about 0.3 lbs/ft$^3$ to about 5.0 lbs/ft$^3$ as measured by ASTM D1622. In another particular embodiment, the foam composition produces foam that is non-toxic. "Non-toxic" as used herein refers to a composition that is free of an isocyanate compound. In an embodiment, the foam may be used for insulation applications.

In an embodiment, the epoxy-containing compound provides the matrix for the foam. Any reasonable epoxy-containing compound may be envisioned having terminal epoxy groups, epoxy groups contained within the internal chemical structure of the epoxy-containing compound, or combination thereof. Exemplary epoxy-containing compounds include bio-based epoxy compounds such as an epoxidized biological oil, petrochemical epoxy resins, or combinations thereof. In a particular embodiment, the epoxy-containing compound is a combination of the epoxidized biological oil and the petrochemical epoxy resin. For instance, the bio-based epoxy resin and the petrochemical epoxy resin are present at a ratio of about 100:0 wt. % to about 0:100 wt. %, such as about 10:90 wt. % to about 50:50 wt. %.

In an embodiment, the epoxy-containing compound may be a petrochemical-based epoxy resin. A petrochemical epoxy resin typically includes a cycloaliphatic and aromatic epoxy compound derived from petrochemicals. The petrochemical resin can include, for example, epoxy resins of glycidyl ethers of polyphenol compounds such as bisphenol A, bisphenol F and 1,1,2,2-tetrakis(4-hydroxyphenyl)ethane; epoxy resins of glycidyl ethers of polyhydric phenols such as catechol, resorcinol, hydroquinone and phloroglucinol; epoxy resins of glycidyl ethers of polyhydric alcohols such as ethylene glycol, butane diol, glycerol, erythritol and polyoxyalkylene glycol; novolak type epoxy resins; alicyclic epoxy resins such as vinylcyclohexene dioxide, limonene dioxide and dicyclopentadiene dioxide; epoxy resins of polyglcidyl esters of condensates of polycarboxylic acids such as phthalic acid and cyclohexane-1,2-dicarboxylic acid; polyglycidyl amine type epoxy resins; and methylepichlorohydrin type epoxy resins. In a particular embodiment, the epoxy resin is an epoxy resin of a glycidyl ether of a polyphenol compound and a novolak type epoxy resin. In another particular embodiment, the epoxy resin is an epoxy resin of a glycidyl ether of bisphenol A or bisphenol F.

A bio-based epoxy compound may also be used as the epoxy-containing component. Any reasonable bio-based epoxy compound may be envisioned. In an embodiment, the bio-based epoxy compound is an at least partially epoxidized biological oil. Examples of suitable biological oils include vegetable oils such as soybean oil, safflower oil, linseed oil, corn oil, sunflower oil, olive oil, canola oil, sesame oil, cottonseed oil, palm oil, rapeseed oil, tung oil, fish oil, peanut oil, and combinations thereof. Natural vegetable oils may be used, and also useful are partially hydrogenated vegetable oils and genetically modified vegetable oils, including high oleic safflower oil, high oleic soybean oil, high oleic peanut oil, high oleic sunflower oil, and high erucic oil such as rape seed oil and crambe oil. In a particular embodiment, the bio-based epoxy compound is derived from a linseed oil. The partially epoxidized vegetable oil may be prepared by a method that includes reacting a vegetable oil with a peroxyacid under conditions that convert less than 100% of the double bonds of the vegetable oil to epoxide groups. Typically, the preparation of the partially epoxidized vegetable oil will also include combining another acid with the vegetable oil and peroxyacid components to form a mixture that reacts to form a partially epoxidized vegetable oil. The partially epoxidized vegetable oil may include at least about 10%, at least about 20%, at least about 25%, at least about 30%, at least about 35%, at least about 40% or more of the original amount of double bonds present in the vegetable oil. The partially epoxidized vegetable oil may include up to about 90%, up to about 80%, up to about 75%, up to about 70%, up to about 65%, up to about 60%, or fewer of the original amount of double bonds present in the vegetable oil.

The foam composition further includes a cationic catalyst. Any reasonable cationic catalyst is envisioned that reacts with and polymerizes the epoxy-containing compound. In a particular embodiment, the cationic catalyst reacts within a desirable time period to cure the epoxy-containing compound. In an exemplary embodiment, the cationic catalyst polymerizes the epoxy-containing resin to both evaporate the blowing agent when present as well as cure the epoxy-containing compound. For instance, the cationic catalyst includes an acid such as a Lewis acid (such as a $BF_3$ complex) or a Brønsted acid. In an embodiment, the acid is a superacid, a partial ester of an acid, a borane catalyst, a phosphoric acid derivative, or any combination thereof. Examples of superacids include $HBF_4$, $CF_3SO_3H$ (triflic acid), $HSbF_6$, $HPF_6$, $FSO_3H$, $HClO_4$, $CF_3(CF_2)_x$—$SO_3H$, $FSO_3H$—$SbF_5$ (magic acid), or combinations thereof. In an embodiment, the superacid has a pKa of about −8 to about −25. In an embodiment, borane catalysts include, for example, trimethoxyboroxine, pyridine borane, or combinations thereof. Exemplary phosphoric acid derivatives include glyceryl phosphoric, glyceryl di-phosphate, glycerol-phosphic acid solution, glycerol propoxylate-phosphate, or combinations thereof. In an embodiment, the cationic catalyst is present in an amount to polymerize the epoxy-containing compound. In an embodiment, the cationic catalyst is present in an amount of less than about 5.0 wt. %, such as less than 4.0 wt. %, such as less than 3.0 wt. %, or even less than 2.0 wt. %, based on the total weight of the composition. In a particular embodiment, the cationic catalyst is present at an amount of about 0.05 wt. % to about 2.0 wt. %, based on the total weight of the composition. For instance, the superacid catalyst is present at an amount of about 0.05 wt. % to about 2.0 wt. %, based on the total weight of the composition.

The foam composition may include an optional blowing agent. Any reasonable blowing agent used for foams is envisioned. Blowing agents may include compounds that have a chemical action and/or compounds having physical action. The term physical blowing agents means compounds which have been emulsified or dissolved in the starting materials for the polymerization of the epoxy-containing compound and vaporize under the conditions of the polymerization. The term chemical blowing agents means compounds which form gaseous products via a chemical reaction. Chemical blowing agents can be any of a variety of chemicals which release a gas upon thermal decomposition. Chemical blowing agents may also be referred to as foaming agents. The blowing agent, or agents, if more than one is used, can be selected from chemicals containing decomposable groups such as azo, N-nitroso, carboxylate, carbonate, hetero-cyclic nitrogen-containing and sulfonyl hydrazide groups. In a particular embodiment, blowing agents are selected from endothermic and exothermic varieties, such as dinitrosopentamethylene tetramine, p-toluene solfonyl semicarbazide, 5-phenyltetrazole, calcium oxalate, trihydrazino-s-triazine, 5-phenyl-3,6-dihydro-1,3,4-oxandiazin-2-one, 3,6-dihydro 5,6-diphenyl-1,3,4 oxadiazin-2-one, azodicarbonamide, sodium bicarbonate, and mixtures thereof. In an embodiment, the blowing agents are materials that liberate gas when heated by means of a chemical reaction or upon decomposition. Blowing agents further include, for example, water, carbon dioxide, butane, pentane, the like, or combinations thereof.

The blowing agent may be added to the epoxy-containing compound in several different ways which are known to those skilled in the art, for example, by adding a solid power, liquid or gaseous agents directly to the epoxy-containing compound in a liquid resin state to obtain uniform dispersion of the agent in the foam composition. The temperature and pressure to which the composition of the invention are subjected to provide the foam will vary within a wide range, depending upon the amount and type of the blowing agent, epoxy-containing compound, and cationic catalyst that is used. In a particular embodiment, the blowing agent is present in an amount to provide the foam with the density as described. For instance, the blowing agent may be present in an amount of at least about 1.0 wt. %, such as about 5.0 wt. % to about 30.0 wt. %, based on the total weight of the composition.

In an embodiment, the foam composition includes an additive such as a flame retardant. Any reasonable flame retardant is envisioned. In an embodiment, the flame retardant includes organohalogen or organophosphorus-type flame-retardants, such as tris(dichloropropyl)phosphate, tris(chloroethyl)phosphate, melamine polyphosphate, dibromoneopentyl glycol, glycol esters or ethers derived from tetrabromo or tetrachlorophthalic anhydride, tetrabromophthalate diol, as well as other reactive or non-reactive additive types of flame-retardants containing combinations of P, Cl, Br, and N, can be added to impart flame-resistant properties to the foam and foam composites. In an embodiment, the flame retardant is added in an amount to provide self-extinguishing properties of the foam. For instance, the flame retardant is present at about 5.0 wt. % to about 30.0 wt. %, based on the total weight of the composition.

In an embodiment, the material may include any number of other additives to impart or to enhance properties desired in the final foam. Such additives may include, for example, a surfactant, a catalyst carrier, a co-reactant, a lubricant, a substance having fungistatic and bacteriostatic action, a filler, and the like. For instance, any reasonable surfactants may be envisioned. In a particular embodiment, the surfactant may be used to regulate cell size, foam density, or combination thereof. Exemplary surfactants include silicone-based surfactants such as those commercially available from Dow Corning Corporation of Midland, Mich., USA and Siltech Corporation of Toronto, Ontario, CANADA. Exemplary surfactants further include Dabco®-brand surfactant commercially available from Air Products and Chemicals, Inc. of Allentown, Pa., USA and Struktol®-brand surfactant commercially available from CellChem International, LLC of Atlanta, Ga., USA. An exemplary catalyst carrier may be, for example, phthalates such as dimethyl phthalate, polyhydroxyl compounds, or combinations thereof. In a particular embodiment, the catalyst carrier is dimethyl phthalate. In an embodiment, at least one additive may be used to regulate the reaction rate of the polymerization of the epoxy-containing resin. For instance, a co-reactant may be used to regulate the ring opening of the epoxy functional group. An exemplary co-reactant includes, for example, diols, glycerin, or combination thereof. In an embodiment, fillers may include fibers such as glass and natural fibers. Fillers further include micron and nano-sized particulates including clays, calcium carbonate, silica, quartz, graphite, antistatic graphenes, carbon black and others.

In an embodiment, the foam can have properties desirable for insulation applications. For instance, the foam can have desirable physical properties such as thermal resistance in the range of R 3.0 per inch to R 7.0 per inch (R=hr ° F. ft$^2$/BTU), density, compressive strength, tensile strength, water vapor permeation, air permeability, and dimensional stability. As stated earlier, the density of the foam is typically from about 0.3 lbs/ft$^3$ to about 5.0 lbs/ft$^3$ as measured by ASTM D1622. In an embodiment, the morphology of the cells of the foam may be a substantially open cell structure or a substantially closed cell structure. In a particular embodiment, the foam is a substantially closed cell structure. "Substantially closed cell" as used herein refers to a foam wherein the cell structure of the foam is formed of individual polyhedral cells wherein at least greater than about 50% of the cells do not have open windows or panes within each individual cell. In a particular embodiment, the foam has a substantially open cell structure. "Substantially open cell" as used herein refers to foam wherein the cell structure of the foam is formed of individual polyhedral cells wherein at least greater than about 50% of the cells have open windows or panes within each individual cell. In an embodiment, the cell structure is substantially uniform. "Substantially uniform" as used herein refers to a cell structure wherein the size of the cells throughout the foam vary by less than about 50%, such as less than about 40%, such as less than about 30%.

In an embodiment, the foam can be further have desirable properties such as adhesive bonding to a substrate, mechanical properties, weather, and thermal stability, and desirable flame resistance. For instance, the foam cohesively bonds to the substrate to which it is applied. In an embodiment, "cohesively bonds" as used herein refers to no visible delamination of the foam to the substrate.

Turning to the method of making the foam, the epoxy-containing compound can be combined with a cationic catalyst, the optional blowing agent, and at least one additive. Any suitable combination may be used to combine the components and form the foam composition. For instance, the components may be mixed in a single part system or a multiple part system. In an embodiment, the components are mixed in a two part system, with each part having any suitable combination of the components. The two part system can be mixed together to form the foam composition. In a particular embodiment, the epoxy-containing compound and the cationic catalyst react to polymerize the epoxy-containing compound. In an embodiment, the foam composition can react to form a foam without a blowing agent. In an alternative embodiment, the blowing agent is present to foam the polymerized epoxy-containing compound to provide the foam. In an embodiment, the cationic catalyst is chosen to provide a speed of polymerization of the epoxy-containing compound that both cures the epoxy-containing compound and evaporates the blowing agent. In a particular embodiment, the cationic catalyst provides a gel time of about 5 seconds to about 180 seconds, such as about 10 seconds to about 50 seconds. "Gel time" as used herein refers to the time it takes for the combined components to reach a transition change that occurs between a liquid form to a solid form.

In a particular embodiment, the foam may be installed by applying the foam composition on a material; or on a continuous conveyor; or into a container, cavity, or mold that defines a shape. In an embodiment, the material may be a structure for a building, a furniture article, an automotive article, and the like. Applying may be by any reasonable means such as spraying, pouring such as pouring-in place, or molding. Spraying may be by any reasonable means envisioned, such as with a spray gun or static mixer with air atomization. In a particular embodiment, the components of the foam composition are mixed and the composition is then sprayed in-place directly on the material. In a particular embodiment, the sprayed foam composition hardens to form the foam in about 30 seconds to about 5 minutes from the time the foam composition exits the spray gun. Conditions for spraying may be dependent on the materials chosen as well as the application. Typically, the spray gun uses an air atomizer to apply the foam composition. An air atomizer may be a low pressure atomizer or a high pressure atomizer. "Low pressure" as used herein refers to a pressure of about 10 psi to about 100 psi. "High pressure" as used herein refers to a pressure of about 200 psi to about 1500 psi.

The foam composition and foam can be used for any application where the above-properties are desired. Any applications of the foam composition and foam include, for example, uses when the properties such as the above-mentioned physical properties, speed of gel time and cure, and/or mechanical properties are desired. The foam composition and foam may also possess other properties desired for any particular application envisioned. In a particular embodiment, the foam composition and foam are desirable for an insulation structure. In a further embodiment, the foam composition and foam can be used for acoustical insulation, air sealing, gasketing, cushioning, bedding, packaging applications and for applications that require a product to float in water.

EXAMPLES

Five samples of a foam composition are prepared. The compositions can be found in Tables 1-5.

TABLE 1

Boroxine Example

| Component | % Weight in Formulation |
|---|---|
| Epoxidized Soybean Oil | 60.6 |
| Blowing Agent (Enovate 3000) | 22.3 |
| Trimethoxy Boroxine | 11.3 |
| cycloaliphatic diepoxy ELR-4221 | 3.2 |
| Surfactant, Tegostab B 8476 | 0.9 |
| Surfactant, Tegostab B 8526 | 0.9 |
| Pyridine Borane | 0.8 |
| Total | 100.0 |

TABLE 2

Pure Bio-Based Example

| Component | % Weight in Formulation |
|---|---|
| Epoxidized Linseed Oil | 68.0 |
| Blowing Agent (Enovate 3000) | 25.5 |
| Terol 925 | 3.8 |
| Surfactant - Silstab 3000 | 1.7 |
| Catalyst - $HBF_4$ | 0.5 |
| Water | 0.5 |
| Total | 100.0 |

TABLE 3

Pure Petrochemical Based Example

| Component | % Weight in Formulation |
|---|---|
| Dow Epoxy Resin 330 | 58.3 |
| Blowing Agent (Enovate 3000) | 16.2 |
| Fire Retardant, DP-45 | 14.9 |
| Dimethyl Phthalate | 8.4 |
| Surfactant Silstab 2760 | 1.6 |
| Water | 0.3 |
| Catalyst - $HBF_4$ | 0.3 |
| Total | 100.0 |

TABLE 4

Blended Resin Example

| Component | % Weight in Formulation |
|---|---|
| Dow Epoxy Resin 331 | 35.6 |
| Epoxidized Linseed Oil | 19.5 |
| Blowing Agent (Enovate 3000) | 16.2 |
| Fire Retardant, BP-59 | 14.9 |
| Terol 305 | 6.5 |
| SPI - ERL 4221 Epoxy Plasticizer | 3.2 |
| Dimethyl Phthalate | 1.9 |
| Surfactant Silstab 3000 | 1.6 |
| Water | 0.3 |
| Catalyst - $HBF_4$ | 0.3 |
| Total | 100.0 |

TABLE 5

$BF_3$ Complex Catalyst Example

| Component | % Weight in Formulation |
|---|---|
| Dow Epoxy Resin 383 | 50.5 |
| Blowing Agent (Enovate 3000) | 16.5 |
| Fire Retardant, Melamine Polyphosphate | 13.2 |
| Dimethyl Phthalate | 8.7 |
| Dow Epoxy Resin 661 | 5.6 |
| SPI - ERL 4221 Epoxy Plasticizer | 3.3 |
| Surfactant | 1.7 |
| Catalyst - $BF_3$ Dihydrate complex | 0.5 |
| Total | 100.0 |

The compositions are then applied on a wood surface using both a low pressure air atomizer (80 psi) or a high pressure air atomizer (1200 psi). The foams have excellent reactivity with no delamination or shrinkage. Further, the foams all have a density of about 0.5 lbs/ft³ to about 2.5 lbs/ft³.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded as an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A foam composition consisting of a resin matrix, wherein the resin matrix consists of an epoxy-containing compound; a cationic catalyst consisting of a superacid, a $BF_3$ complex, a phosphoric acid derivative, or combination thereof; an optional blowing agent; and at least one additive; wherein the composition is free of an isocyanate compound, the foam having a density from about 0.3 lbs/ft$^3$ to about 5.0 lbs/ft$^3$ as measured by ASTM D1622.

2. The foam of claim 1, wherein the epoxy-containing compound is bio-based, petrochemical based, or combination thereof.

3. The foam of claim 2, wherein the bio-based epoxy compound is derived from linseed oil, corn oil, soybean oil, sunflower oil, safflower oil, canola oil, rapeseed oil, palm oil, camelina oil, fish oil, tall oil, algae oil, or combinations thereof.

4. The foam of claim 2, wherein the petrochemical based epoxy-containing compound consists of a cycloaliphatic epoxy compound and an aromatic epoxy compound.

5. The foam of claim 1, wherein the superacid is $HBF_4$, $CF_3SO_3H$ (triflic acid), $HSbF_6$, $HPF_6$, $FSO_3H$, $HClO_4$, $CF_3(CF_2)x$-$SO_3H$, $FSO_3H$—$SbF_5$ (magic acid) or combinations thereof.

6. The foam of claim 5, wherein the superacid has a pKa of about −8 to about −25.

7. The foam of claim 1, wherein the additive consists of a surfactant.

8. The foam of claim 1, wherein the additive consists of a fire retardant.

9. The foam of claim 1, wherein the additive consists of a co-reactant including a diol, a glycerin, or a combination thereof.

10. The foam of claim 1, wherein the additive consists of a catalyst carrier.

11. The foam of claim 10, wherein the catalyst carrier consists of a polyhydroxyl compound.

12. The foam of claim 1, wherein the cationic catalyst is present at an amount of about 0.05 wt. % to about 5.0 wt. %, based on the total composition.

13. The foam of claim 1, wherein the blowing agent is present at an amount of about 5.0 wt. % to about 30.0 wt. %, based on the total composition.

14. The foam of claim 1, wherein the cationic catalyst provides a gel time of about 5 seconds to about 180 seconds.

15. The foam of claim 14, wherein the cationic catalyst provides a gel time of about 10 seconds to about 50 seconds.

16. A building cavity comprising the foam of claim 1.

17. A method of installing a foam in a building cavity comprising:
    mixing a composition consisting of a resin matrix, wherein the resin matrix consists of an epoxy-containing compound, a cationic catalyst consisting of a superacid, a $BF_3$ dihydrate complex, or combination thereof, an optional blowing agent and at least one additive to form an epoxy matrix foam composition; and
    spraying the foam composition to the building cavity, wherein the foam is isocyanate free and has a density from about 0.3 lbs/ft$^3$ to about 5.0 lbs/ft$^3$ as measured by ASTM D1622.

18. The method of claim 17, wherein the cationic catalyst provides a gel time of about 5 seconds to about 180 seconds.

19. The method of claim 17, wherein the sprayed foam composition hardens in about 30 seconds to about 5 minutes.

20. The method of claim 17, wherein the superacid has a pKa of about −8 to about −25.

* * * * *